US007752291B2

(12) United States Patent
Yoshida et al.

(10) Patent No.: US 7,752,291 B2
(45) Date of Patent: Jul. 6, 2010

(54) SERVER BORROWING APPARATUS ALLOCATING SERVER TO USER GROUP AND COMPUTER PRODUCT THEREFOR

(75) Inventors: Hideki Yoshida, Tokyo (JP); Tetsuro Kimura, Tokyo (JP); Yuuichi Koba, Kanagawa (JP); Teruyoshi Zemmyo, Kanagawa (JP); Nobuo Sakiyama, Kanagawa (JP); Hideaki Hirayama, Kanagawa (JP); Kenichi Mizoguchi, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 950 days.

(21) Appl. No.: 11/222,801

(22) Filed: Sep. 12, 2005

(65) Prior Publication Data
US 2006/0116897 A1    Jun. 1, 2006

(30) Foreign Application Priority Data
Nov. 30, 2004    (JP)    ............................ 2004-347418

(51) Int. Cl.
*G06F 15/177*    (2006.01)
(52) U.S. Cl. ........................ 709/222; 709/220; 709/221; 709/228
(58) Field of Classification Search ................. 709/222, 709/220, 221, 228
See application file for complete search history.

(56) References Cited

U.S. PATENT DOCUMENTS

| | | | |
|---|---|---|---|
| 6,832,242 B2 * | 12/2004 | Keskar | ....................... 709/204 |
| 7,062,529 B2 * | 6/2006 | Deboer et al. | ............... 709/203 |
| 2002/0176573 A1 * | 11/2002 | Futa et al. | ..................... 380/44 |
| 2003/0126426 A1 * | 7/2003 | Frye, Jr. | ......................... 713/2 |
| 2005/0055595 A1 * | 3/2005 | Frazer et al. | ................ 713/400 |
| 2005/0120160 A1 * | 6/2005 | Plouffe et al. | .................. 711/1 |
| 2005/0132325 A1 * | 6/2005 | Unbehagen | ................. 717/103 |
| 2005/0188191 A1 | 8/2005 | Yoshida et al. | |

OTHER PUBLICATIONS

Yoshida, Hideki et al., Inter-Cluster Resource Borrowing Using Grid Technologies, 66th National Convention of Information Processing Society of Japan, pp. 5-81 through 5-84, (Mar. 2004).

* cited by examiner

*Primary Examiner*—Joon H Hwang
*Assistant Examiner*—Jaren M Means
(74) *Attorney, Agent, or Firm*—Finnegan, Henderson, Farabow, Garrett & Dunner, L.L.P.

(57) ABSTRACT

A server borrowing apparatus, includes a storing unit that stores lender installation setting information which includes a setting item determined by a server lender for installation of a server which is lent out as resource, a receiving unit that receives a request to lend out the server as the resource and borrower installation setting information which includes a setting item determined by a server borrower for the installation of the server, from a borrowing control apparatus which is connected to a network to manage the server and to control server borrowing, a combining unit that combines the setting item in the borrower installation setting information and the setting item in the lender installation setting information to generate installation setting information for the installation of the server at the server borrowing, and an installing unit that performs the installation of the server based on the installation setting information.

13 Claims, 8 Drawing Sheets

FIG.4

```
LANGUAGE
lang JA_JP
#TIME ZONE
timezone Japan
#DESIGNATION OF MEDIA FOR INSTALLATION, DESIGNATION OF LOCATION OF MEDIA
url --url ftp://192.168.10.1/os/
# SETTING OF DISC PARTITION (CAPACITY OF RESPECTIVE PARTITIONS OR RATIO OF CAPACITY)
clearpart -all
part /boot --size=100
part / --ratio=1
part /usr --ratio=4
#NETWORK SETTING
network --bootproto=dhcp
#SELECTION OF SOFTWARE TO BE INSTALLED (APPLICATION, LIBRARY OR THE LIKE)
%packages
@Base
kernel
dhcp
apache
```

```
LANGUAGE
lang JA_JP
#TIME ZONE
timezone Japan
#DESIGNATION OF MEDIA FOR INSTALLATION AND DESIGNATION OF LOCATION OF MEDIA
url --url ftp://192.168.10.1/os/
#DEVICE SETTING
device ethernet wd --opts "io=0x280, irq=3"
#SETTING OF DISC PARTITION (CAPACITY OF RESPECTIVE PARTITIONS)
clearpart -all
part /boot --size=100          ─── 601
part / --size=3980
part /usr --size=15920
#NETWORK SETTING
network --bootproto=dhcp --device=eth0   ─── 602
#SELECTION OF SOFTWARE TO BE INSTALLED (APPLICATION, LIBRARY OR THE LIKE)
%packages
@Base
kernel
dhcp
apache
```

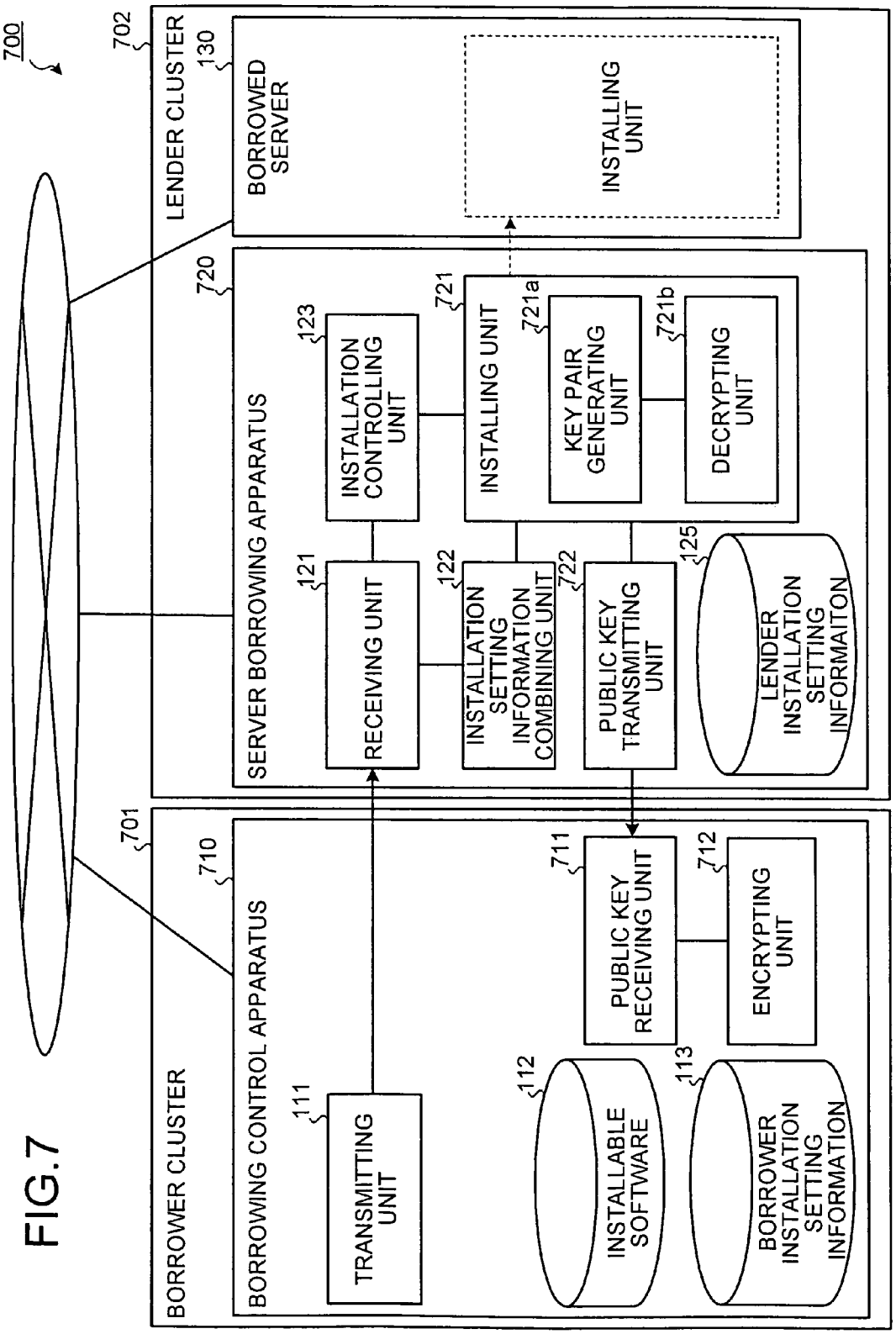

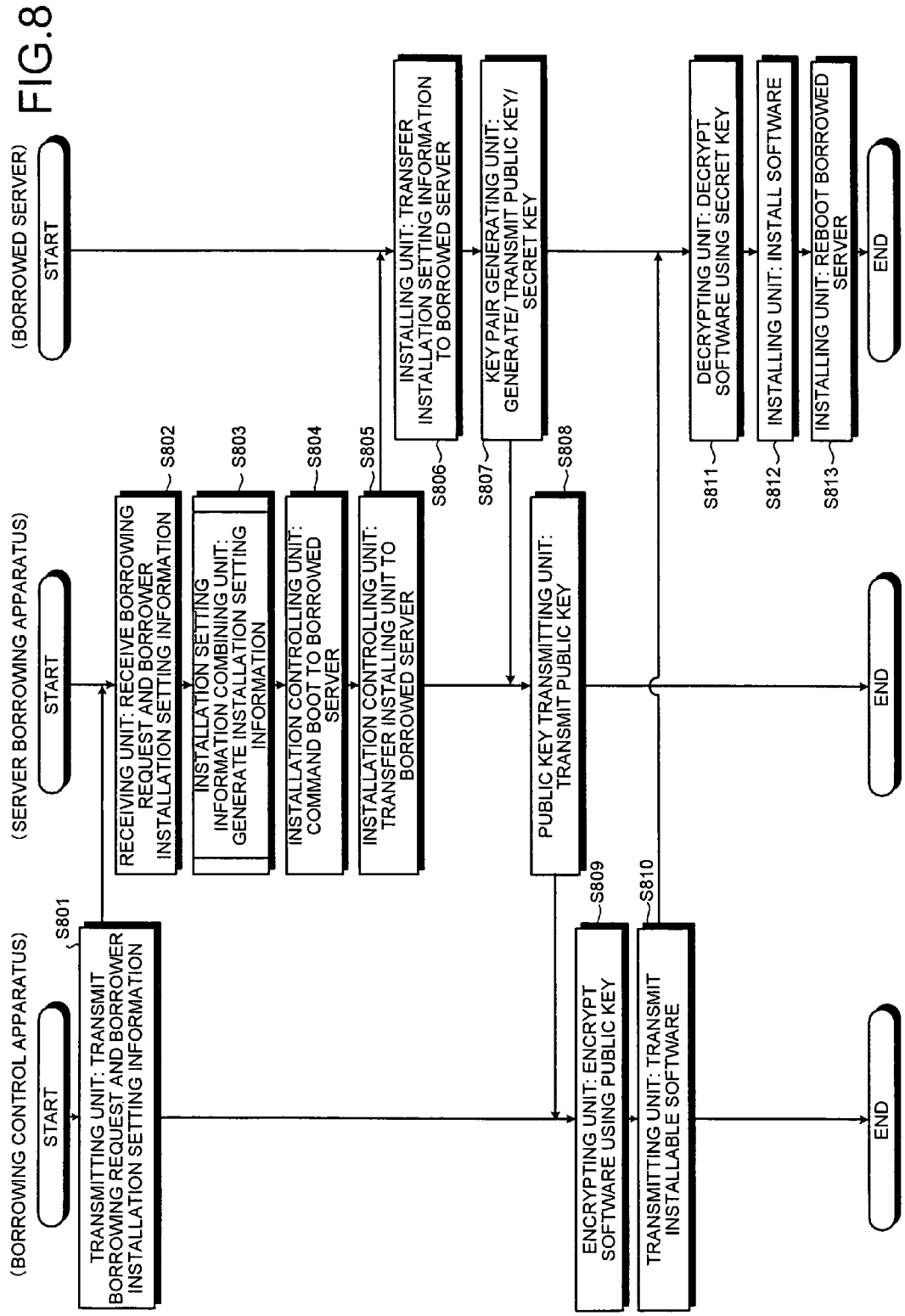

SERVER BORROWING APPARATUS ALLOCATING SERVER TO USER GROUP AND COMPUTER PRODUCT THEREFOR

CROSS-REFERENCE TO RELATED APPLICATIONS

This application is based upon and claims the benefit of priority from the priority Japanese Patent Application No. 2004-347418, filed on Nov. 30, 2004; the entire contents of which are incorporated herein by reference.

BACKGROUND OF THE INVENTION

1. Field of the Invention

The present invention relates to server borrowing apparatuses, methods of server borrowing, and computer program products for server borrowing for collectively allocating a server to a user group.

2. Description of the Related Art

In recent years, introduction of "grid computing" into server allocation is proposed to meet demands for, for example, improved server utilization, capability to handle a temporary increase in system load, and alleviation of negative impact of hardware failure. In a grid computing system in general, a server is shared by plural user groups and plural application programs run in parallel for respective user groups. In such a grid computing system where one server is shared by plural user groups, however, adjustment of resource allocation, such as allocation of CPU time, among user groups is required, and in addition, security has to be guaranteed for each of user groups.

To avoid these problems, a grid computing system employing a technique of server borrowing is proposed. The server borrowing is a technique to collectively lend out a server as a whole from one user group, which has sufficient servers to do away with one server, to another user group suffering from shortage of server capacity due to some problems such as a temporary load increase and hardware failure. For example, Hideki Yoshida, Nobuo Sakiyama, Toshibumi Seki, Tatsunori Kanai & Hideaki Hirayama, "Inter-Cluster Resource Borrowing through Grid Technology" (66th National Convention of Information Processing Society of Japan, March 2004) discloses a technique to borrow/lend various resources such as a server (node) among plural clusters using the grid technology. Here, "server borrowing" refers to one manner of resource borrowing which includes borrowing of any computational resources such as disks and networks besides the servers.

When such technique of server borrowing is employed, one server is borrowed as a whole between user groups and one user group utilizes the server at one time. Hence, the problems concerning resource allocation and security among different user groups do not arise as in the server sharing among plural user groups. An entity that performs the server borrowing is assumed mainly to be a cluster system that collectively manages the servers at the layer of middleware or operating systems (OSs). However, the entity of the server borrowing can be any system provided with plural servers such as a system configured as a combination of a load distribution apparatus and a WEB server, other than the cluster. Server borrowing may be realized so that the plural user groups mutually lend the server as described above. In addition, server borrowing can be realized so that only a dedicated lending group lends the server to other user groups.

In such server borrowing, a server which is lent to one user group may be lent to another user group afterwards. Then, the use of the server generally changes, which requires reinstallation of the OS and the application. Since the server borrowing is automatically realized according to the condition of server utilization, a human server manager cannot be expected to manually perform the reinstallation. Hence in the server borrowing, automatic installation of the OS and the application is required.

Generally, the term automatic installation refers to a manner of software installation that does not require manual manipulation by a manager. In the ordinary manual installation, setting information is manually provided by the manager, whereas in the automatic installation, a setting information file where such setting information is described is prepared, and the installation is performed automatically according to the contents of the setting information file.

The automatic installation which realized by such a rigid setting information file presupposes that the setting information can be previously determined. For example, even when there are plural options for one piece of setting information for one system, the automatic installation can be realized through preparation of plural setting information files and choosing one file as appropriate at each installation as far as each of the plural options for setting information is previously determinable.

In the reinstallation in the server borrowing, however, the setting information which is peculiar to each user group cannot be determined before it is known which user group is the lender and which user group is the borrower. Hence, the automatic installation cannot be realized according to the conventional manner where the rigid setting information files need to be previously prepared.

Some setting information is determined depending on the condition of the borrower user group. For example, it is usually the borrower side that sends request for installation setting related with a purpose of server use, e.g., a type of software to be used, a manner of software setting. On the other hand, some setting information is determined depending on the condition of the lender user group, which physically possesses the server. For example, it is usually the lender side that determines a setting request related with the server hardware and the server environment, e.g., a type of hardware to be used, and a manner of hardware setting. Further, some setting information is determined depending on the conditions of both the borrower and the lender. For example, security setting and network setting relate to the requests from both the lender group and the borrower group.

Hence, the setting information as a whole required for the reinstallation at the server borrowing varies according to the condition, i.e., depending on which server of which user group is to be lent to which group. Generally, it cannot be previously determined which server of which group is to be lent to which group, and the setting information for the installation cannot be prepared in advance. This means that in the server borrowing, the automatic installation cannot be realized in the conventional manner using the rigid setting information file.

Presently, a technique for automatic installation which solves the problems encountered in the server borrowing as described above is not proposed. Though Yoshida et al. mentioned above discloses interface expansion for the inter-cluster resource borrowing, they do not mention how to realize automatic installation.

SUMMARY OF THE INVENTION

According to one aspect of the present invention, a server borrowing apparatus includes a storing unit that stores lender installation setting information which includes a setting item determined by a server lender for installation of a server which is lent out as resource; a receiving unit that receives a request to lend out the server as the resource and borrower installation setting information which includes a setting item determined by a server borrower for the installation of the server, from a borrowing-control apparatus which is connected to a network to manage the server and to control server borrowing; a combining unit that combines the setting item in the borrower installation setting information and the setting item in the lender installation setting information, to generate installation setting information for the installation of the server at the server borrowing; and an installing unit that performs the installation of the server based on the installation setting information.

According to another aspect of the present invention, a method of server borrowing includes receiving a request to lend out a server as resource and borrower installation setting information which includes a setting item determined by a server borrower for installation of the server, from a borrowing control apparatus which is connected to a network to manage the server; generating installation setting information for the installation at the server borrowing by combining the setting item in the borrower installation setting information and a setting item in lender installation setting information which includes a setting item determined by a server lender for the installation of the server; and performing the installation of the server based on the installation setting information.

A computer program product according to still another aspect of the present invention causes a computer to perform the method according to the present invention.

BRIEF DESCRIPTION OF THE DRAWINGS

FIG. 4 is an explanatory diagram of an example of borrower installation setting information;

FIG. 6 is an explanatory diagram of an example of installation setting information;

FIG. 7 is a block diagram of a structure of a server borrowing apparatus according to a second embodiment; and FIG. 8 is a flowchart of an automatic installation process in the server borrowing apparatus according to the second embodiment.

DETAILED DESCRIPTION OF THE PREFERRED EMBODIMENTS

In the following, an exemplary embodiment of a server borrowing apparatus, a method of server borrowing, and a computer program product for server borrowing according to the present invention are described in detail with reference to the accompanying drawings.

A server borrowing apparatus according to a first embodiment combines installation setting information of a borrower side and installation setting information of a lender side at a time of server borrowing, and automatically executes installation of a server to be lent according to the combined installation setting information.

Figure 1:
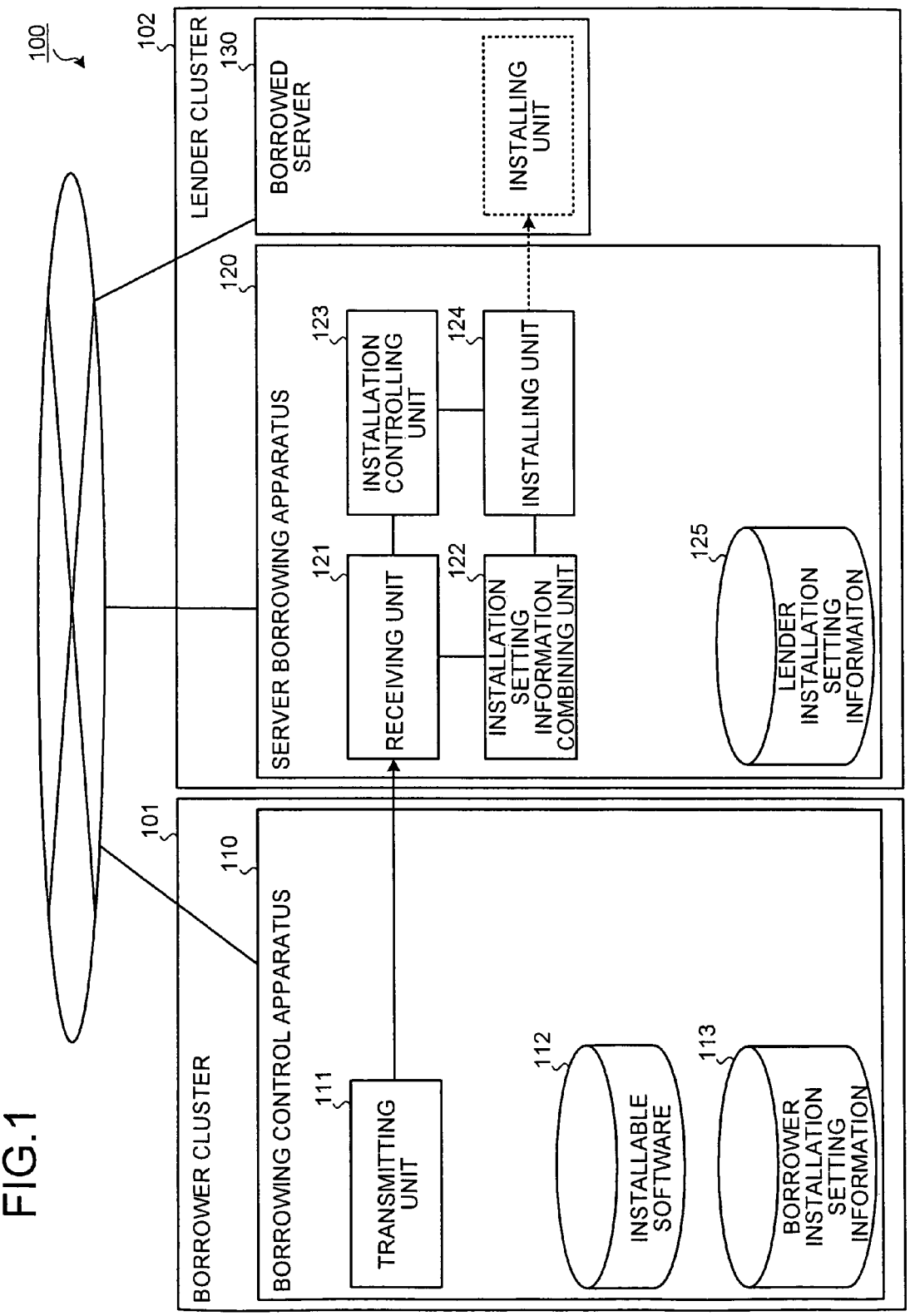
FIG. 1 is a block diagram of a structure of a server borrowing apparatus according to a first embodiment of the present invention.

FIG. 1 is a block diagram of an overall structure of a server borrowing system 100 including a server borrowing apparatus 120 according to the first embodiment. As shown in FIG. 1, the server borrowing system 100 includes a borrower cluster 101 and a lender cluster 102 connected via a network. In the first embodiment, the cluster is employed as the entity of server borrowing.

The borrower cluster 101 is a cluster managed by a borrower user group which borrows the server. The borrower cluster 101 includes a borrowing control apparatus 110, and a borrower cluster manager (not shown) which monitors the server failure and loaded condition of the server in the borrower cluster 101 and controls operations of the server and an application therein. The borrowing control apparatus 110 and the borrower cluster manager may be formed as an integrated unit.

The lender cluster 102 is a cluster managed by a lender user group which lends a server. The lender cluster 102 includes a server borrowing apparatus 120, a borrowed server 130 which is to be borrowed by the borrower user group, and a lender cluster manager (not shown) which monitors the server failure and loaded condition of the server in the lender cluster 102 and controls operations of the server and an application therein. The server borrowing apparatus 120 and the lender cluster manager may be formed as an integrated unit.

The borrowing control apparatus 110 controls the borrowing in the server borrowing in the borrower cluster 101 and includes a transmitting unit 111. In addition, the borrowing control apparatus 110 stores installable software 112 and borrower installation setting information 113 in a hard disk drive (HDD).

The installable software 112 is software to be installed in the borrowed server 130 and utilized when the borrower user group borrows the borrowed server 130. Such installable software is, for example, an application and a library to be used on the borrowed server 130.

Among necessary setting information for the installation of the borrowed server 130, the borrower installation setting information 113 includes setting information which depends on the condition, for example, the purpose of server use and the manner of use, of the borrower user group. The borrower installation setting information 113 is, for example, used language, time zone, designation of the installable software 112, designation of media on which the installable software 112 is to be installed, and designation of a location of the media on which the installable software 112 is to be installed.

The transmitting unit 111 transmits a server borrowing request, the borrower installation setting information 113, and the installable software 112 to the server borrowing apparatus 120.

The server borrowing apparatus 120 controls the server borrowing in the lender cluster 102. The server borrowing apparatus 120 includes a receiving unit 121, an installation setting information combining unit 122, an installation controlling unit 123, and an installing unit 124. In addition, the server borrowing apparatus 120 stores the lender installation setting information 125 in the HDD.

Among necessary setting information for the installation of the borrowed server 130, the lender installation setting information 125 includes setting information which depends on the condition of the lender user group such as hardware configuration of the server and environment of setting. The lender installation setting information 125 is, for example, information concerning device setting of the borrowed server 130.

When plural borrowed server 130 with the same hardware configuration are present, the setting information of the plural borrowed servers 130 may be made common and managed collectively.

The setting information which depends both on the borrower's condition, e.g., purpose of the server use and the manner of use, and on the lender's condition, e.g., the hardware configuration and the setting environment of the server, is managed by both of the borrower installation setting information 113 and the lender installation setting information 125. Such setting information is, for example, setting of disk partition, and network setting.

The receiving unit 121 receives the server borrowing request sent from the transmitting unit 111 of the borrowing control apparatus 110 and the borrower installation setting information 113.

The installation setting information combining unit 122 combines the borrower installation setting information 113 received by the receiving unit 121 and the lender installation setting information 125 stored in the HDD, to generate necessary installation setting information at a time of installation of the borrowed server 130.

The installation controlling unit 123 performs operations such as designation of boot for preparing for the installation of the borrowed server 130, and transfer of the installing unit 124 to the borrowed server 130.

The installing unit 124 acquires installation setting information from the server borrowing apparatus 120 and executes the installation of the borrowed server 130 according to the acquired installation setting information. The installing unit 124 exists on the server borrowing apparatus 120, though the contents thereof is transferred to the borrowed server 130 at the time of installation and executed on the borrowed server 130. Here, the installing unit 124 may be configured so that the installing unit 124 exists on an apparatus other than the server borrowing apparatus 120 and is transferred to the borrowed server 130.

Figure 2:
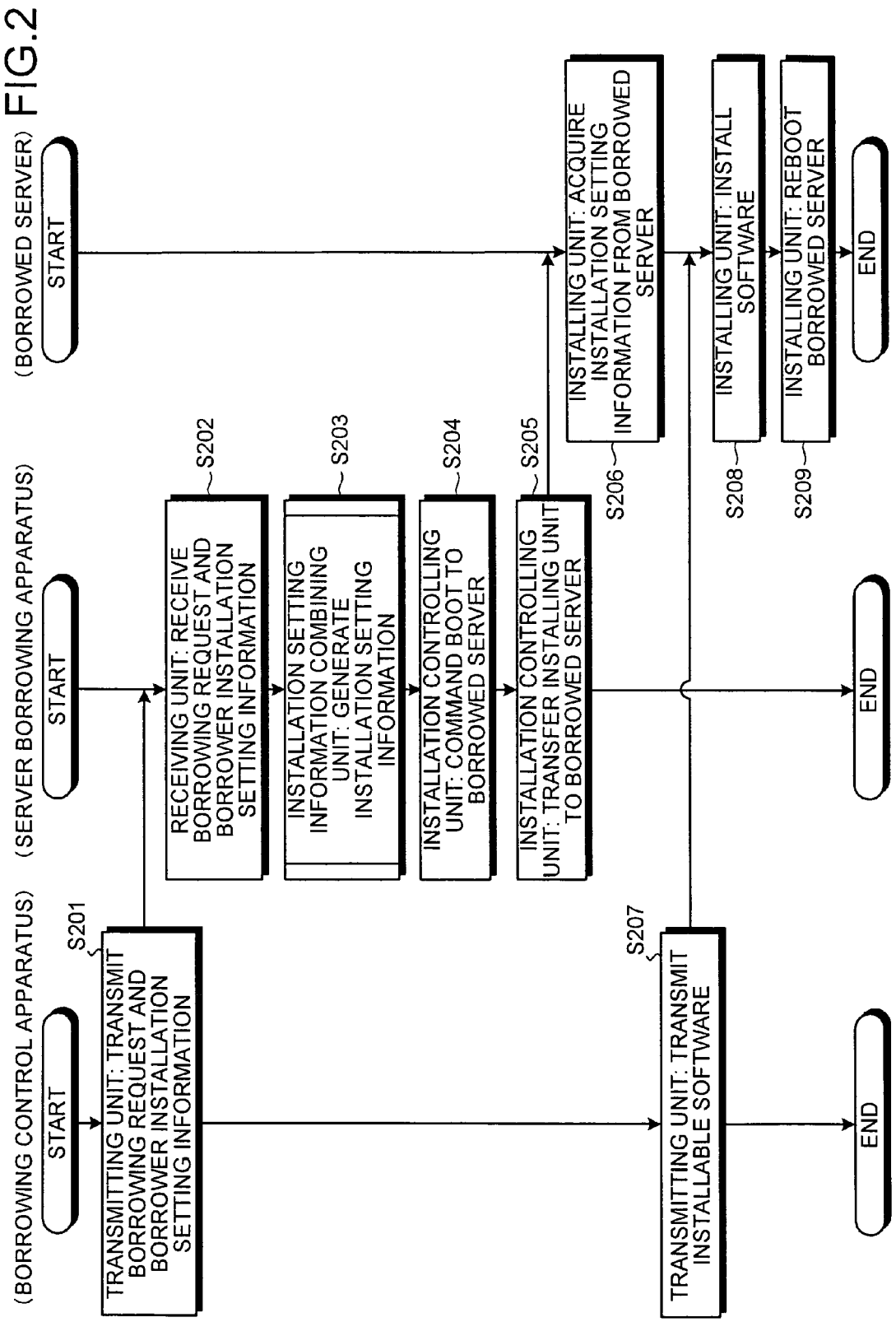
FIG. 2 is a flowchart of an automatic installation process in the server borrowing apparatus according to the first embodiment.

Next, an automatic installation process of the borrowed server 130 in the server borrowing process performed by the server borrowing apparatus 120 according to the first embodiment having the above-described structure will be described. FIG. 2 is a flowchart of an overall process flow of the automatic installation process according to the first embodiment.

First, the transmitting unit 111 on the borrowing control apparatus 110 transmits the server borrowing request and the borrower installation setting information 113 to the server borrowing apparatus 120 (step S201). Here, the server borrowing request is information of request which identifies a server and demands lending thereof. The server borrowing request is sent after the search for a borrowable server in a cluster outside the borrower cluster and determination of a server to borrow. Such server borrowing request includes, for example, information on an IP address of the server to borrow, but is not limited thereto, as far as it is information identifying a server and requesting the lending thereof.

Then, the receiving unit 121 of the server borrowing apparatus 120 receives the server borrowing request and the borrower installation setting information 113 sent by the transmitting unit 111 (step S202).

The installation setting information combining unit 122 generates installation setting information from the received borrower installation setting information 113 and the lender installation setting information 125 stored in the HDD (step S203). The details of the installation setting information generation process will be described later with reference to a flowchart of FIG. 3.

After the generation of the installation setting information, the installation controlling unit 123 transmits the boot designation to the borrowed server 130 (step S204). Such function can be realized by appropriate setting of Basic Input/Output System (BIOS) of the borrowed server 130, for example, which allows for the transmission of the boot designation via a network.

Then, the installation controlling unit 123 transfers the installing unit 124 to the borrowed server 130 (step S205). Here, the installing unit 124 may not be transferred to the borrowed server 130 by the installation controlling unit 123 on the server borrowing apparatus 120, but may be acquired from the borrowed server 130 at the time of boot of the borrowed server 130. Though in the first embodiment, the installing unit 124 is acquired from the server borrowing apparatus 120, the installing unit 124 may be acquired from another server in the lender cluster 102.

The installing unit 124 transferred to the borrowed server 130 acquires the installation setting information from the server borrowing apparatus 120 (step S206). The installing unit 124 sets the disk partition for the HDD of the borrowed server 130 and executes the installation of the OS according to the acquired installation setting information, and the transmitting unit 111 of the borrowing control apparatus 110 transmits the installable software 112 to the borrowed server 130 according to an instruction from the installing unit 124 (step S207).

Here, the installable software 112 may be handled in another server such as a file server (not shown) in the borrower cluster 101, and transmitted therefrom.

The installing unit 124 executes installation of the installable software 112 transmitted from the borrowing control apparatus 110 (step S208). After the completion of the installation of all installable software 112, the installing unit 124 performs reboot of the borrowed server 130 (step S209), and the automatic installation process completes.

Here, the installing unit 124, the installation setting information, and the installable software 112 may be transmitted via any file sending protocol, which is commonly used, such as FTP, HTTP, and NFS. Further, though the boot and the installation of the borrowed server 130 are executed after the generation of the installation setting information in the above-described sequence, the installation setting information may be generated and sent to the borrowed server 130 after the boot of the borrowed server 130 when the borrowed server 130 requests.

Figure 3:
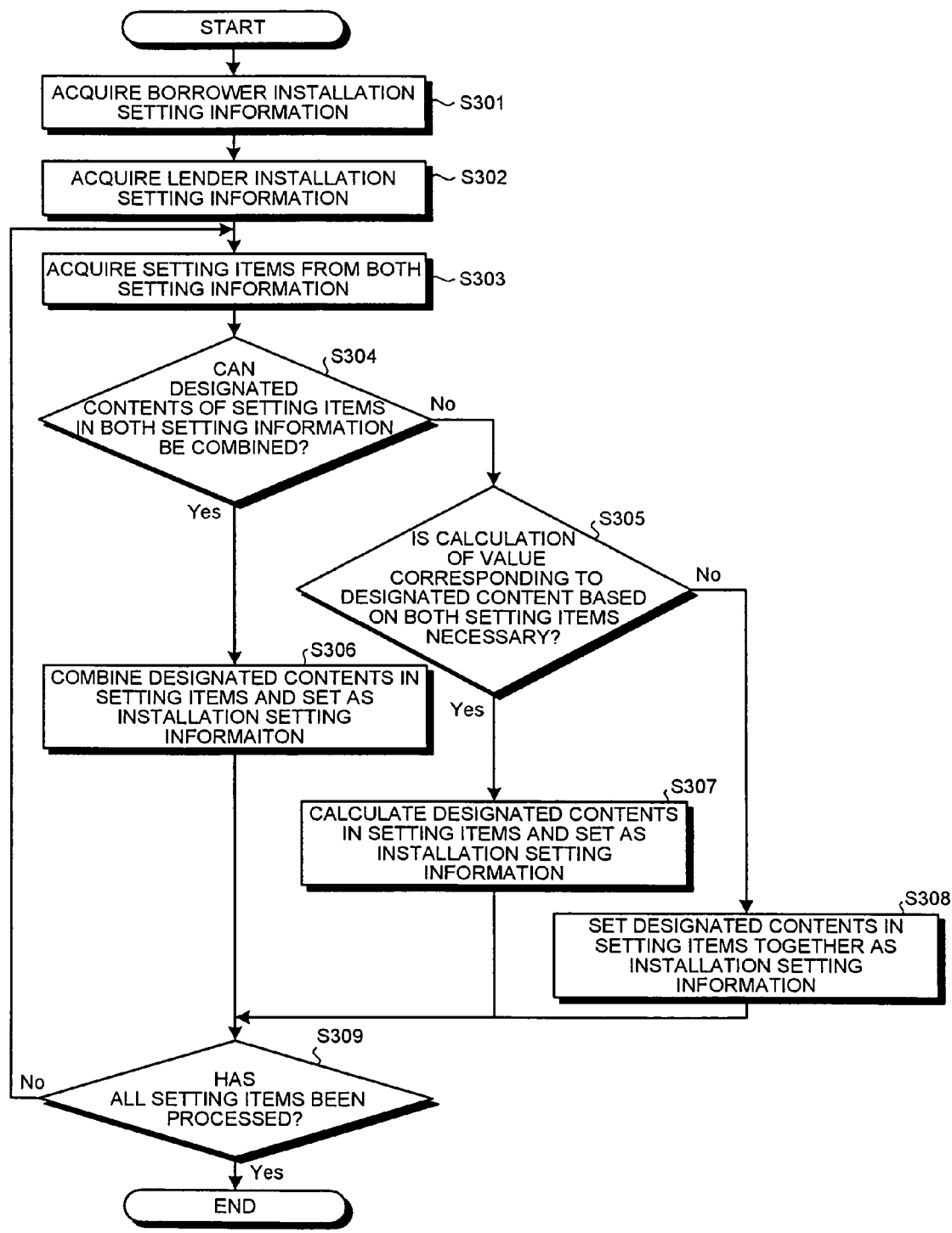
FIG. 3 is a flowchart of an installation setting information generation process in the server borrowing apparatus according to the first embodiment.

The details of the installation setting information generation process in step S203 of FIG. 2 will be described. FIG. 3 is a flowchart of process sequence of the installation setting information generation process. The following process is executed by the installation setting information combining unit 122.

First, the borrower installation setting information 113 received by the receiving unit 121 is acquired (step S301) and the lender installation setting information 125 stored in the HDD of the server borrowing apparatus 120 is acquired (step S302). Then, setting items designating respective piece of information relating to the installation are acquired from the acquired setting information (step S303).

Then, the setting items in the borrower installation setting information 113 is compared with the setting items in the lender installation setting information 125, and it is determined whether the contents designated therein can be combined or not (step S304). When it is determined that the combination is possible (YES in step S304), the designated contents are combined and set as the installation setting information (step S306).

For example, assume that the borrower installation setting information 113 designates "--bootproto=dhcp" whereas the lender installation setting information designates "--device=eth0" as the setting item "network" concerning the network. Here, "--bootproto=dhcp" indicates that Dynamic Host Configuration Protocol (DHCP) is utilized as the boot protocol for the network. On the other hand, "--device=eth0" indicates that a device defined as "eth0" is employed as a network device.

Thus, the designated contents represent a designated network protocol and designated network device, respectively. Since these have to be set together at the installation, they are determined to be combinable. As a result, the designated contents are combined to be "network --bootproto=dhcp --device=eth0", which is set as one setting item in the installation setting information.

When the designated contents cannot be combined (NO in step S304), it is determined whether a value corresponding to the designated contents must be calculated based on the setting items (step S305). When it is determined that the calculation is necessary (YES in step S305), the calculation is performed according to a predetermined rule based on the designated contents, and the resulting setting items are set as the installation setting information (step S307).

For example, assume that the borrower installation setting information 113 includes three designated contents "part/boot --size=100", "part/--ratio=1", "part/usr --ratio=4", while the lender installation setting information 125 includes a designated content "disksize 20000" for the setting items "part" and "disksize" relating to the disk partition. Here, "part/boot --size=100" indicates that the size of boot partition is 100 MB, and "part/--ratio=1" and "part/usr --ratio=4" together indicate that the ratio of the size of the root partition and the user partition is 1:4. Further, "disksize 20000" indicates that the physical size of the disk of the borrowed server 130 is 20 GB.

Since such designated contents cannot be simply combined, specific values corresponding to the setting information must be calculated for the installation of the actual borrowed server 130 according to the designated contents. In the above example, the size of boot partition 100 MB is subtracted from the disk size 20 GB, and the remaining size is divided by the ratio of 1:4 to produce the sizes of the root partition and the user partition. As a result, three setting items, i.e., "part/boot --size=100", "part/size=3980", "part/usr --size=15920", are set as the installation setting information.

When it is determined that the calculation of the value corresponding to the designated contents is not necessary for either designated items (No in step S305), the setting items are set as they are together in the installation setting information (step S308).

For example, setting information on language "lang JA_JP" which depends solely on the manner of use by the borrower user group, and setting information on time zone "timezone Japan" do not require combination with the lender setting information or specific calculation, and hence set as the installation setting information as they are.

Next, it is determined whether all the setting items are processed or not (step S309), and when not all the items are processed (NO in step S309), the installation setting information combining unit 122 moves back to the setting item acquisition process and repeats the process (step S303). When all the items are processed (YES in step S309), the installation setting information generation process ends.

Figure 5:
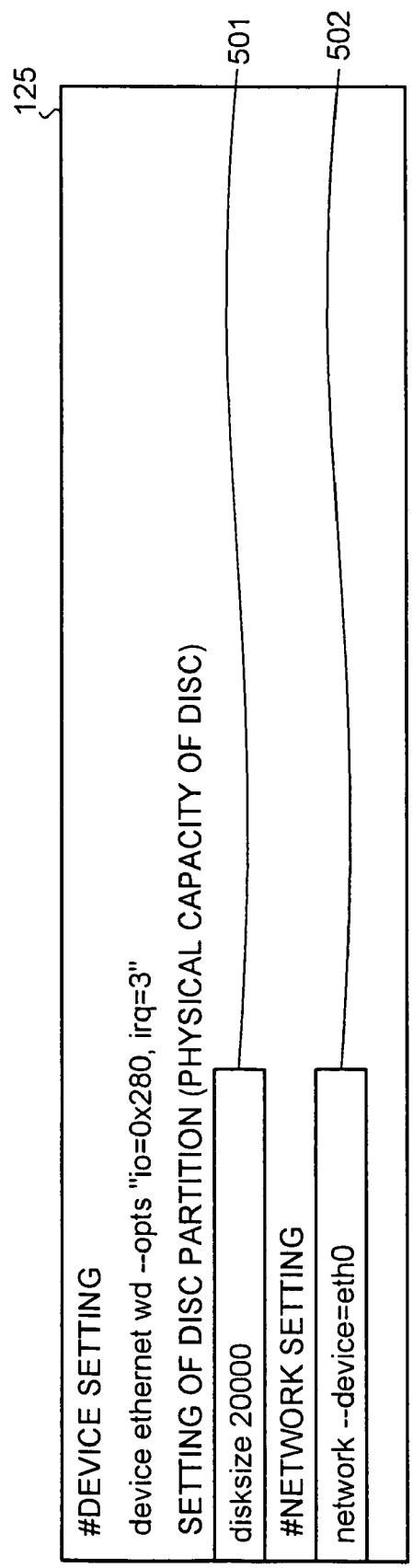
FIG. 5 is an explanatory diagram of an example of lender installation setting information.

FIGS. 4 to 6 are explanatory diagrams showing examples of the contents of setting information which may be generated when the server borrowing apparatus 120 according to the first embodiment combines the borrower installation setting information 113 and the lender installation setting information 125 to generate the installation setting information according to the installation setting information generation process as described above.

FIG. 4 is an explanatory diagram of an example of the borrower installation setting information 113. A setting item 401 represents a setting item which requires calculation with the setting item in the lender installation setting information. A setting item 402 represents a setting item which can be combined with the setting item in the lender installation setting information 125. Other setting items represent setting items which can be directly set as the installation setting information.

FIG. 5 is an explanatory diagram of an example of the lender installation setting information 125. A setting item 501 requires calculation with the setting item in the borrower installation information 113. A setting item 502 can be combined with the setting item in the lender installation setting information 113. Other setting items can be directly set as the installation setting information.

FIG. 6 is an explanatory diagram of installation setting information generated by combining of the borrower installation setting information 113 shown in FIG. 4 and the lender installation setting information 125 shown in FIG. 5 according to the installation setting information generation process. A setting item 601 represents setting items obtained as specific values via calculation based on the setting item 401 shown in FIG. 4 and the setting item 501 shown in FIG. 5. In the example of FIG. 6, the set calculation result is same with the example of setting items relating to the disk partition mentioned above.

A set item 602 is a setting item obtained via combining of the setting item 402 of FIG. 4 and the setting item 502 of FIG. 5. In the example of FIG. 6, the setting item is same with the example of the combined setting items related to the network mentioned above.

As shown in FIG. 6, the setting items shown in FIGS. 4 and 5 which do not correspond to the setting items 601 and 602 in FIG. 6 are described in FIG. 6 without change.

Thus, in the server borrowing apparatus 120 according to the first embodiment, the borrower installation setting information 113 and the lender installation setting information 125 are combined at the server borrowing, to generate the installation setting information. Hence, even if the rigid installation setting information is not formed prior to the server borrowing, the automatic installation of the borrowed server 130 can be realized.

The server borrowing apparatus according to the first embodiment receives necessary information for the installation, such as the borrower installation setting information 113 and the installable software 112 from the borrowing control apparatus 110 to realize the automatic installation.

In the installation for the server borrowing among different user groups, however, security can be an issue. When user groups are connected via a network, such as the Internet through which alteration and/or eavesdropping of the transmitted information is possible, the necessary information for the installation might be altered and/or eavesdropped. For the prevention of such alteration/eavesdropping, the communication between the borrowed server 130 and the borrowing control apparatus 110 must be encrypted. However, if the encrypting is realized with a fixed coding key, and the borrowed server 130 is lent out first to one user group A and then to another user group B, one user group A comes to know such coding key prior to the use of the borrowed server 130 by another user group B. Then the user group A can alter/eavesdrop the communication by the user group B which borrows the server afterwards.

To eliminate such inconvenience, at the installation of the server, a server borrowing apparatus according to a second embodiment generates a pair of public key and a secret key which is effective only during a period of server borrowing, and encrypts/decrypts necessary information for the installation using the key pair, thereby making automatic installation more secure.

FIG. 7 is a block diagram of an overall structure of a server borrowing system 700 including a server borrowing apparatus 720 according to the second embodiment. As shown in FIG. 7, the server borrowing system 700 includes a borrower cluster 701 and a lender cluster 702 connected via a network.

The borrower cluster 701 includes a borrowing control apparatus 710 and a borrower cluster manager (not shown). The lender cluster 702 includes a server borrowing apparatus 720, a borrowed server 130, and a lender cluster manager (not shown).

The borrowing control apparatus 710 includes a transmitting unit 111, a public key receiving unit 711, and an encrypting unit 712. Further, the borrowing control apparatus 710 stores installable software 112 and borrower installation setting information 113 in an HDD.

The server borrowing apparatus 720 includes a receiving unit 121, an installation setting information combining unit 122, an installation controlling unit 123, an installing unit 721, and a public key transmitting unit 722. The installing unit 721 includes a key pair generating unit 721a and a decrypting unit 721b. Further, the server borrowing apparatus 720 stores the lender installation setting information 125 in an HDD.

The server borrowing apparatus according to the second embodiment is different from the server borrowing apparatus according to the first embodiment in that the public key receiving unit 711 and the encrypting unit 712 are added in the borrowing control apparatus 710, and that the key pair generating unit 721a, the decrypting unit 721b, and the public key transmitting unit 722 are added in the server borrowing apparatus 720. Other structure and function of the server borrowing system 700 according to the second embodiment are same with those of the server borrowing system 100 including the server borrowing apparatus 120 according to the first embodiment shown in the block diagram of FIG. 1. The same part is denoted by the same reference character and the description thereof is not repeated.

The key pair generating unit 721a generates a pair of public key and secret key at the installation according to public key cryptosystem. The public key transmitting unit 722 transmits the public key generated by the key pair generating unit 721a to the borrowing control apparatus 710.

The public key receiving unit 711 receives the public key transmitted by the public key transmitting unit 722. The encrypting unit 712 encrypts necessary information for the installation using the public key received by the public key receiving unit 711. Here, the necessary information for the installation means information which is indispensable for the execution of installation, and includes information such as information to be installed, information designating a way to install, and information for the control of installation process. For example, the installable software 112 and the borrower installation setting information 113 are necessary information for the installation. It should be noted that these are exemplary only and the necessary information for the installation may include other information, as far as it is indispensable for the execution of installation.

The decrypting unit 721b decrypts the necessary information for the installation which is encrypted by the encrypting unit 712 at the installation of the borrowed server 130. The installing unit 721 is different from the installing unit 124 of the server borrowing apparatus 120 according to the first embodiment in that the installing unit 721 includes the key pair generating unit 721a and the decrypting unit 721b.

The automatic installation process of the borrowed server 130 in the server borrowing process by the server borrowing apparatus 720 according to the second embodiment with the above-described structure will be described. FIG. 8 is a flowchart of an overall sequence of the automatic installation process according to the second embodiment.

A process of transmission/reception of the borrowing request and the borrower installation setting information, a process of installation setting information generation, a process of the borrowed server booting, and a transfer process of the installation-related information from step S801 to step S806 are same with the process from step S201 to step S206 in the server borrowing apparatus 120 according to the first embodiment and the description thereof will not be repeated.

After the installing unit 721 on the borrowed server 130 acquires the installation setting information from the server borrowing apparatus 720 (step S806), the key pair generating unit 721a generates a pair of public key/secret key and transmits the same to the server borrowing apparatus 720 (step S807).

Then, in the server borrowing apparatus 720, the public key transmitting unit 722 transmits the public key received from the borrowed server 130 to the borrowing control apparatus 710 (step S808). In the borrowing control apparatus 710, the encrypting unit 712 encrypts the installable software 112 using the transmitted public key (step S809).

Here, the borrowing control apparatus 710 may transmit the borrower installation setting information 113 in response to a request from the borrowed server 130, and the server borrowing apparatus 720 may generate the installation setting information from the received borrower installation setting information 113 and sends the installation setting information to the borrowed server 130. In this case, the borrower installation setting information may also be encrypted by the encrypting unit 712.

Thereafter, the transmitting unit 111 of the borrowing control apparatus 710 transmits the installable software 112 encrypted by the encrypting unit 712 to the borrowed server 130 according to an instruction from the installing unit 721 (step S810).

Then, the decrypting unit 721b on the borrowed server 130 decrypts the installable software 112 after the encrypting transmitted by the transmitting unit 111 (step S811). Here, the decrypting is performed with the use of the secret key generated by the key pair generating unit 721a.

The installing unit 721 executes the installation of the installable software 112 transmitted from the borrowing control apparatus 710 (step S812). After the completion of the installation of all installable software 112, the installing unit 721 performs rebooting of the borrowed server 130 (step S813), and the automatic installation process ends.

In the above embodiment, only the installable software 112 and the borrower installation setting information 113 are encrypted. However, entire communication may be encrypted with the use of protocol such as Encapsulating Security Payload (ESP) of IPsec, Secure Socket Layer (SSL), and Secure Shell (ssh).

In this case, the public key of the borrowing control apparatus 710 needs to be sent to the borrowed server 130 for the encrypting of the communication from the borrowed server 130 to the borrowing control apparatus 710. Then, the public key transmitting unit 722 of the server borrowing apparatus 720 may be configured so as to transmit/receive the public key of the borrowed server 130 and the public key of the borrowing control apparatus 710.

Thus, in the server borrowing apparatus 720 according to the second embodiment, the pair of public key/secret key which is effective only during the server borrowing is generated at the time of installation of the borrowed server 130, and the necessary information for the installation is encrypted/decrypted with the use of the key pair, whereby the automatic installation is realized. Hence, in addition to the realization of security protection for the necessary information for the installation, even when the same borrowed server 130 is utilized by different user groups subsequently, a user group which utilizes the server in the past can be prohibited from altering/eavesdropping the information using a previous secret key, whereby highly secure and reliable automatic installation can be realized.

In the above description, the server borrowing system including the server borrowing apparatus according to the first and the second embodiments employs the cluster system. However, the present invention is applicable to systems other than the cluster system, such as a system including plural servers where, for example, a load distribution apparatus and a WEB server are combined.

The server borrowing apparatus according to the first and the second embodiments includes a controller such as a central processing unit (CPU), storage such as a read only memory (ROM) and a random access memory (RAM), an external storage such as a HDD, and a CD drive, a display such as display monitor, an input device such as a keyboard and a mouse, and is realized in a hardware structure of an ordinary computer.

The server borrowing program executed by the server borrowing apparatus according to the first and the second embodiments is recorded on a computer readable recording medium such as a CD-ROM, a flexible disk (FD), a CD-R, and a Digital Versatile Disk (DVD) in an installable or an executable format file for provision.

Further, the server borrowing program executed by the server borrowing apparatus according to the first and the second embodiments may be stored in a computer connected to a network such as the Internet and the stored program may be downloaded via the network for provision. Still further, the server borrowing program executed in the server borrowing apparatus according to the first and the second embodiments may be provided or distributed via a network such as the Internet.

Still further, the server borrowing program according to the first and the second embodiments may be previously embedded into an ROM or the like for provision.

The server borrowing program executed by the server borrowing apparatus according to the first and the second embodiments is formed so that the above-described units (receiving unit, installation setting information combining unit, installation controlling unit, installing unit, public key transmitting unit, key pair generating unit, and decrypting unit) are formed as a module. In an actual hardware, the CPU reads out the server borrowing program from the recording medium and executes the same to load the respective units on a main memory, thereby generating the receiving unit, the installation setting information combining unit, the installation controlling unit, the installing unit, the public key transmitting unit, the key pair generating unit, and the decrypting unit on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server borrowing apparatus for facilitating lending of a server from a lender cluster to a borrower cluster, comprising:
   a storing unit storing lender installation setting information including a lender setting item determined by the lender cluster and relating to installation of a software application on the server;
   a receiving unit receiving a request to lend out the server and borrower installation setting information including a borrower setting item determined by the borrower cluster relating to the installation of the software application on the server, the borrower setting item relating to a boot partition for rebooting the server upon installation of the software application;
   a combining unit combining the borrower setting item in the borrower installation setting information and the lender setting item in the lender installation setting information to generate installation setting information for the installation of the software application on the server;
   an installing unit performing the installation of the software application on the server based on the installation setting information and reboots the server from the boot partition;
   a central processing unit (CPU) for executing at least the combining unit;
   the lender setting item includes a physical size of a disk of the server;
   the borrower setting item includes a ratio of a size of a first partition to a size of a second partition; and
   the combining unit calculates the size of the first partition and the size of the second partition based on the physical size and the ratio, and generates the installation setting information that includes the size of the first partition and the size of the second partition.

2. The server borrowing apparatus according to claim 1, wherein the combining unit generates the installation setting information by combining the borrower setting item and the lender setting item into a single setting item.

3. The server borrowing apparatus according to claim 1, wherein the combining unit performs a calculation on the borrower setting item and the lender setting item following a predetermined rule, to generate a single setting item as the installation setting information.

4. The server borrowing apparatus according to claim 1, wherein the combining unit generates the installation setting information including the borrower setting item and the lender setting item as separate setting items, when the borrower setting item and the lender setting item are not combined into a single setting item, and when a calculation on the borrower setting item and the lender setting item is not performed to generate a single setting item.

5. The server borrowing apparatus according to claim 1, further comprising:
   a public key transmitting unit transmitting a public key which is used for encrypting information transmitted and received by the borrowing control apparatus and the server, to the borrowing control apparatus and the server; and a decrypting unit decrypting the information encrypted with the public key by the borrowing control apparatus using a secret key which corresponds to the public key, wherein the installing unit performs the installation of the server based on installation information which is necessary information for the installation and included in transmitted information.

6. The server borrowing apparatus according to claim 5, further comprising:

a key pair generating unit generating at a time of the installation of the server a pair of a public key and a secret key that are effective during a period of the server borrowing, wherein the public key transmitting unit transmits the public key to the borrowing control apparatus, and the decrypting unit decrypts the installation information encrypted with the public key by the borrowing control apparatus using the secret key.

7. The server borrowing apparatus according to claim 6, wherein the receiving unit further receives the software application to be installed from the borrowing control apparatus, and the decrypting unit decrypts the borrower installation setting information and the software application as the installation information using the secret key.

8. The server borrowing apparatus according to claim 1, wherein the borrower setting item reflects a size of the boot partition.

9. The server borrowing apparatus according to claim 1, wherein the borrower setting item reflects at least one partition in addition to the boot partition.

10. The server borrowing apparatus according to claim 9, wherein the borrower setting item reflects a size of the at least one additional partition.

11. The server borrowing apparatus according to claim 1, wherein:

the lender setting item includes a designation of a network device;

the borrower setting item includes a designation of a network protocol; and the combining unit combines the designation of the network device and the designation of the network protocol into the single setting item, and generates the installation setting information that includes the combined single setting item.

12. A computer-implemented method for facilitating lending of a server from a lender cluster to a borrower cluster, the computer-implemented method, comprising:

accessing stored lender installation setting information including a lender setting item determined by the lender cluster and relating to installation of a software application on the server;

receiving a request to lend out the server and borrower installation setting information including a borrower setting item determined by the borrower cluster relating to the installation of the software application on the server, the borrower setting item relating to a boot partition for rebooting the server upon installation of the software application;

combining the borrower setting item in the borrower installation setting information and the lender setting item in the lender installation setting information to generate installation setting information for the installation of the software application on the server;

performing the installation of the software application on the server based on the installation setting information;

rebooting the server from the boot partition;

the lender setting item includes a physical size of a disk of the server;

the borrower setting item includes a ratio of a size of a first partition to a size of a second partition; and the combining comprises calculating the size of the first partition and the size of the second partition based on the physical size and the ratio, and generates the installation setting information that includes the size of the first partition and the size of the second partition.

13. A computer application product tangibly embodied on a computer-readable non-transitory medium for causing a processor to implement a method for facilitating lending of a server from a lender cluster to a borrower cluster, the method comprising:

accessing stored lender installation setting information including a lender setting item determined by the lender cluster and relating to installation of a software application on the server;

receiving a request to lend out the server and borrower installation setting information which includes a borrower setting item determined by the borrower cluster relating to the installation of the software application on the server, the borrower setting item relating to a boot partition for rebooting the server upon installation of the software application;

combining the borrower setting item in the borrower installation setting information and the lender setting item in the lender installation setting information to generate installation setting information for the installation of the software application on the server;

performing the installation of the software application on the server based on the installation setting information;

rebooting the server from the boot partition;

the lender setting item includes a physical size of a disk of the server;

the borrower setting item includes a ratio of a size of a first partition to a size of a second partition; and the combining comprises calculating the size of the first partition and the size of the second partition based on the physical size and the ratio, and generates the installation setting information that includes the size of the first partition and the size of the second partition.

* * * * *